(12) United States Patent
Lentz

(10) Patent No.: US 10,531,728 B2
(45) Date of Patent: Jan. 14, 2020

(54) HAND ATTACHABLE ANIMAL WASHING APPARATUS

(71) Applicant: Daniel Jacob Lentz, Campbell, CA (US)

(72) Inventor: Daniel Jacob Lentz, Campbell, CA (US)

(*) Notice: Subject to any disclaimer, the term of this patent is extended or adjusted under 35 U.S.C. 154(b) by 305 days.

(21) Appl. No.: 15/641,018

(22) Filed: Jul. 3, 2017

(65) Prior Publication Data

US 2018/0078028 A1 Mar. 22, 2018

Related U.S. Application Data

(60) Provisional application No. 62/396,123, filed on Sep. 17, 2016.

(51) Int. Cl.
| | |
|---|---|
| *A46B 11/06* | (2006.01) |
| *A46B 1/00* | (2006.01) |
| *A46B 5/04* | (2006.01) |
| *A46B 9/00* | (2006.01) |
| *A46B 11/00* | (2006.01) |
| *A01K 13/00* | (2006.01) |
| *A46B 5/00* | (2006.01) |

(52) U.S. Cl.
CPC .......... *A46B 11/063* (2013.01); *A01K 13/001* (2013.01); *A46B 1/00* (2013.01); *A46B 5/0029* (2013.01); *A46B 5/04* (2013.01); *A46B 9/005* (2013.01); *A46B 11/0006* (2013.01); *A46B 11/0072* (2013.01); *A46B 2200/1093* (2013.01)

(58) Field of Classification Search
CPC ... A46B 11/063; A46B 11/06; A46B 11/0006; A46B 1/00; A46B 5/029; A46B 5/04; A46B 9/005; A46B 11/0072; A46B 2200/1093; A46B 5/0025; A46B 5/002; A46B 5/0033; A46B 2200/10; A46B 2200/20; A01K 13/001
See application file for complete search history.

(56) References Cited

U.S. PATENT DOCUMENTS

| | | |
|---|---|---|
| 836,181 A | 11/1906 | Cray |
| 1,530,327 A | 11/1923 | William |
| 1,534,208 A | 11/1923 | Delsworth |
| 1,533,732 A | 7/1924 | Rupert |
| 2,405,154 A | 3/1944 | Robert |
| 2,562,418 A | 4/1950 | Enrico et al. |
| 2,663,890 A | 12/1953 | Sullins |
| 4,037,790 A | 7/1977 | Resiser et al. |
| 5,048,759 A | 9/1991 | Mazziotta |

(Continued)

*Primary Examiner* — David J Walczak
(74) *Attorney, Agent, or Firm* — Williams Intellectual Property; Benjamin F. Williams

(57) ABSTRACT

A hand attachable animal washing apparatus, attachable upon the hand of a user, enables singlehanded control of water flow and application of water into the coat of an animal. Control of water flow though a molded body portion is effective by singlehanded operation of a valve assembly disposed interiorly within the molded body portion. A user is enabled to open and close the valve assembly by compressing a compressible portion disposed proximally overlying the user's palm when wearing the apparatus upon one hand. A user may thereby control and apply water applied to an animal with one hand while securing and comforting the animal with the other hand.

11 Claims, 5 Drawing Sheets

(56) References Cited

U.S. PATENT DOCUMENTS

| | | | |
|---|---|---|---|
| 5,722,349 | A | 3/1998 | Wolgamuth |
| 6,513,998 | B1 * | 2/2003 | Barry ................. A41D 19/0079 |
| | | | 401/196 |
| 6,834,619 | B1 | 12/2004 | Rampersad |
| 8,794,189 | B1 | 8/2014 | Dahlquist et al. |
| 9,167,948 | B2 | 10/2015 | Tucker |
| 2013/0305998 | A1 | 11/2013 | Brown et al. |
| 2016/0073611 | A1 | 3/2016 | Hightower |

* cited by examiner

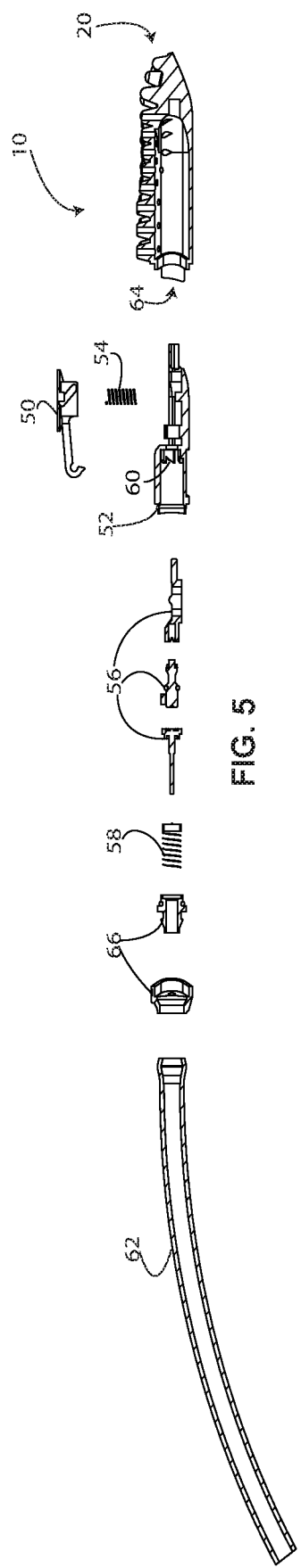

HAND ATTACHABLE ANIMAL WASHING APPARATUS

CROSS-REFERENCE TO RELATED APPLICATIONS

This nonprovisional application claims the benefit of provisional application No. 62/396,123 filed on Sep. 13, 2016

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Washing animals can be troublesome and time consuming. Animals often shy away from water ejected from a hose pipe, which is sometimes noisy. Moreover, use of a hose to wash an animal, which is typical in the art, frequently applies more water than is necessary, ejects water somewhat uncontrollably, and often results in the user getting wet as well. This renders washing an animal an unpleasant experience for all involved.

What is needed is a hand attachable animal washing apparatus that enables singlehanded control of water flow through a plurality of openings to direct application of controlled water flow to an animal while maintaining the user's other hand unencumbered to comfort the animal in question, or secure said animal in place, or otherwise administer additional accouterments desirably wielded during washing. The present hand attachable animal washing apparatus therefore prevents the user from getting wet, enables more controlled application of water to the animal, and lessens discontent of the animal by operating less visibly and quieter than a hose, while enabling the user to coax and comfort the animal with said user's free hand.

FIELD OF THE INVENTION

The present invention relates to a hand attachable animal washing apparatus devised to secure to the hand of a user and enable singlehanded control of water flow therethrough. The present hand attachable animal washing apparatus further enables direct application of water into the fur of an animal without effecting an uncontrolled spray of water. The present hand attachable animal washing apparatus, therefore, enables controlled release of water for direct application to an animal for washing, while allowing a user to maintain one hand free for interaction with the animal or for use wielding additional accouterments desirable during washing.

The present hand attachable animal washing apparatus, therefore, includes a molded body member, formed of polymer which is pliable and yielding to the touch. The molded body member includes an obverse surface having a plurality of outlets and a plurality of protuberances projected perpendicularly therefrom. Each of the plurality of outlets has each of a plurality of openings disposed apically thereatop. Water is enabled passage through the molded body member for controlled emission through each of the plurality of openings by manual action controlling a valve assembly disposed interior to the molded body member. The valve assembly is controllable by manual depression of a compressible portion, disposed interior to the molded body member at a position appropriate to proximally overlie the center of a user's palm to which the present device is attached. A user may, therefore, actuate the device and alternately enable and disable controlled emission of water by action of clenching one hand, wherein said user's fingers depress the compressible portion. Thus a user is enabled singlehanded control of water for direct and controlled application directly into the animal's coat. Moreover, the plurality of protuberances and plurality of outlets are devised to penetrate into the animal's fur and contact the animal's epidermis, whereby the animal is brushed and stroked during the act of washing, which may comfort the animal even while water and soap is being applied into the animal's coat.

SUMMARY OF THE INVENTION

The present hand attachable animal washing apparatus, described subsequently in greater detail, has been devised to enable control of outflow of water singlehandedly while washing an animal, such as a dog or horse, for example. The present hand attachable animal washing apparatus enables use of one hand when applying water whereby the other hand may be used to secure or comfort that animal being washed. The animal is therefore more receptive to washing than is typically the case when a hose, sponge, and soap are more haphazardly applied absent the present invention.

The present hand attachable animal washing apparatus includes a molded body member attachable overtop the palm of a hand of a user. In the example embodiment set forth herein, the molded body member is generally ovoid and formed, or otherwise molded, of an impermeable polymer, such as, for example, silicone. The molded body member is therefore pliable and flexible. The molded body member includes an obverse surface and a reverse surface. The reverse surface is generally smooth and devised for comfortable fit overtop a user's palm, as will be described subsequently. The obverse surface includes a plurality of openings disposed to emit water when the molded body member is connected to a water outlet and a valve assembly, disposed interior to the molded body member, is toggled between a closed situation and an open situation, as will be described subsequently.

In the example embodiment herein described, each of the plurality of openings is disposed apically atop each of a plurality of outlets. Each of the plurality of outlets is elongate, conical, and perpendicularly disposed atop the obverse surface. The plurality of outlets is disposed in a central cluster, essentially overtop the valve assembly interior to the molded body member, and in open communication therewith, whereby flow of water through the molded body member is effective through the central cluster. Surrounding the central cluster is a plurality of protuberances, each of which plurality of protuberances is perpendicularly disposed atop the obverse surface, there devised to penetrate into the fur of an animal, stimulate the epidermis, and brush the animal's coat during washing.

The molded body member is delimited by a distal arced edge, a proximal arced edge, a first side apex, and a second side apex. The molded body member may taper in thickness towards each of the first side apex and the second side apex. A strap member is disposed upon the first side apex and devised to releasably secure to a connection portion disposed upon the second side apex. The strap member and connection portion may resemble a watch strap, for example, and releasable securement may be effective by action of a buckle member disposed to interconnect said strap member with the connection portion.

The molded body member is therefore postionable upon the palm of a user's hand and then securable by engagement of each of the strap member and connection portion connectable around the dorsal of said user's hand. A connecting line is disposed at the proximal arced edge, said connecting line devised for distal attachment to a water outlet, such as a tap, wherein water is introducible into the molded body member and therein controllable by action of the valve assembly.

The valve assembly includes a compressible portion disposed against the action of a first spring member. The compressible portion is disposed interior to the molded body portion proximally located in a position appropriate to overlie the center of a user's palm when said user is wearing the device. The compressible portion is depressible when a user effects a first with the hand wearing the device, and inwardly clenches said user's fingers to engage the compressible portion against the action of the first spring member. The compressible portion toggles outflow of water from the plurality of openings by moving a switch member alternately between each of a first position and a second position whereby throughflow of water is enabled and alternately disabled.

In the example embodiment depicted herein, and described subsequently in more detail below, the switch member is disposed against the action of a second spring member. When moved to the first position, the switch member is first forced in a first direction and compresses the second spring member. The second spring member is thus tensioned against the switch member, but is prevented from rebounding due to the switch member being oriented against a stop member. Throughflow of water through a valve outlet disposed in the valve assembly is now enabled, and water is thus emitted from the plurality of openings for controlled application to an animal. Subsequent depression of the compressible portion thence disengages the switch member from the stop member, whereby the second spring member rebounds and forces the switch member to the second position whereby the valve outlet is closed and the valve assembly subsequently rendered in the closed situation. Throughflow of water is thus disabled.

A user is thus enabled expedient control of throughflow of water when washing an animal, and may expediently toggle the present device to wet the animal and then rinse subsequent application of soap, for example. The polymeric molded body member is pliable and yielding, and therefore enables direct application of water into the animal's coat, and further acts as an applicator brushing the water and any applied soap into the animal's coat. The user may also use said user's other hand for holding the animal, comforting the animal, or for other actions useful in expediting washing an animal due to singlehanded operation of the present device controlling application of water for washing and rinsing said animal, as desired.

Thus has been broadly outlined the more important features of the present hand attachable animal washing apparatus so that the detailed description thereof that follows may be better understood and in order that the present contribution to the art may be better appreciated.

For better understanding of the hand attachable animal washing apparatus, its operating advantages and specific objects attained by its uses, refer to the accompanying drawings and description.

BRIEF DESCRIPTION OF THE DRAWINGS

Figures
FIG. 5 is an side elevation exploded view of an example embodiment.

DETAILED DESCRIPTION OF THE DRAWINGS

Figure 1:
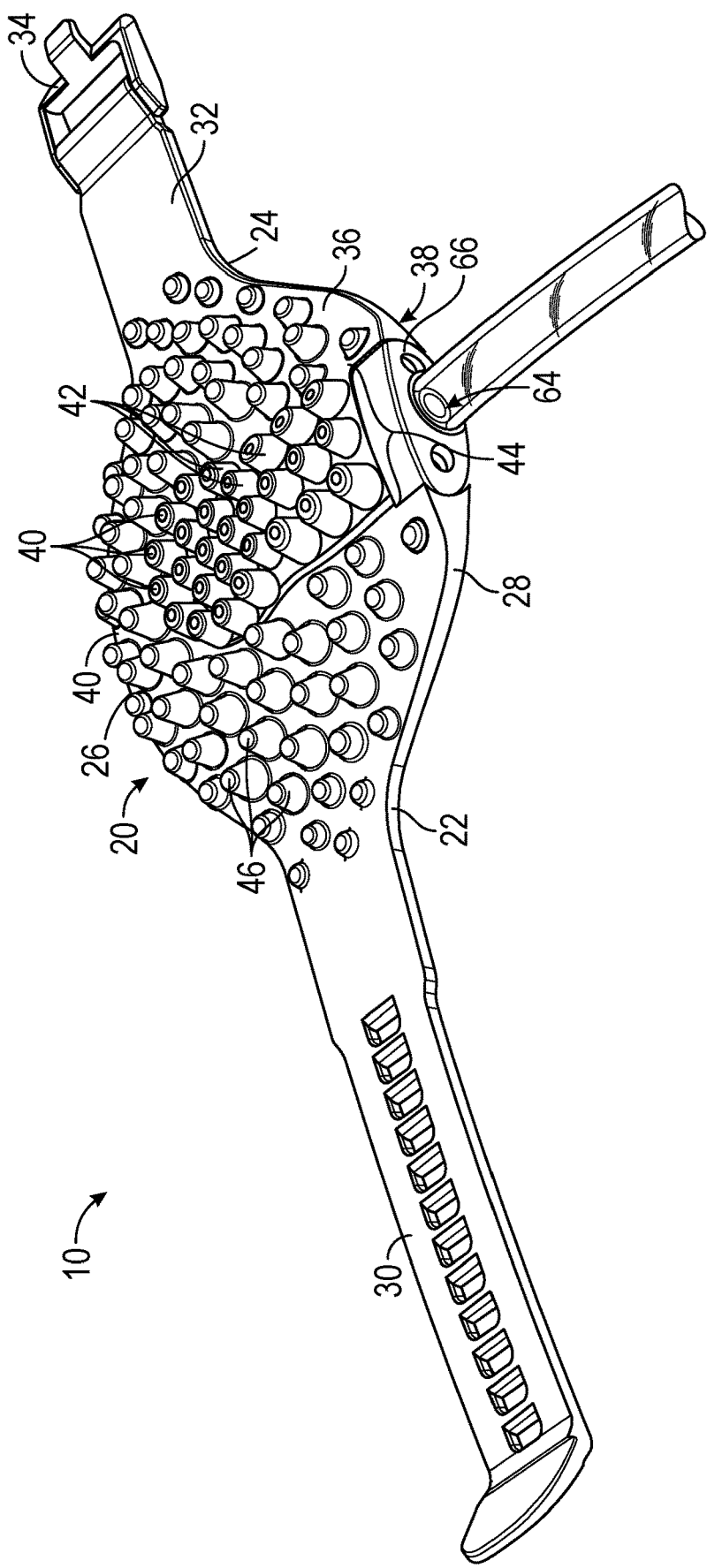
FIG. 1 is a plan elevation view of an example embodiment.
Figure 2:
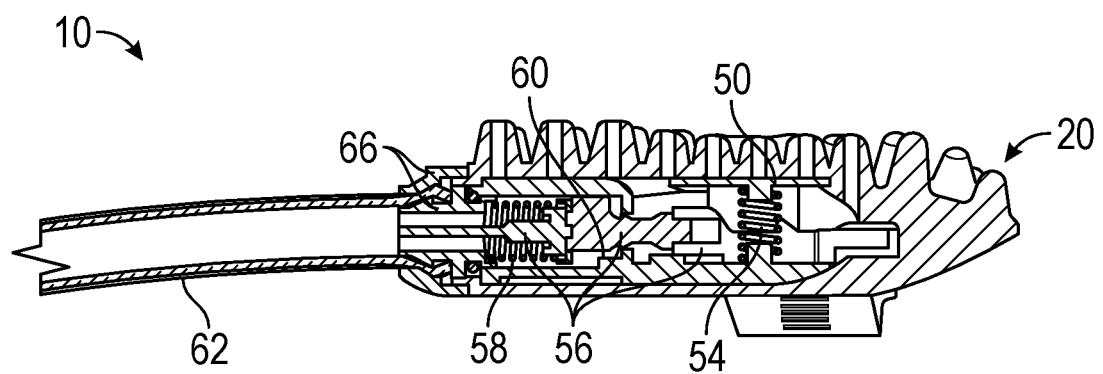
FIG. 2 is a longitudinal cross-section view of an example embodiment.
Figure 3:
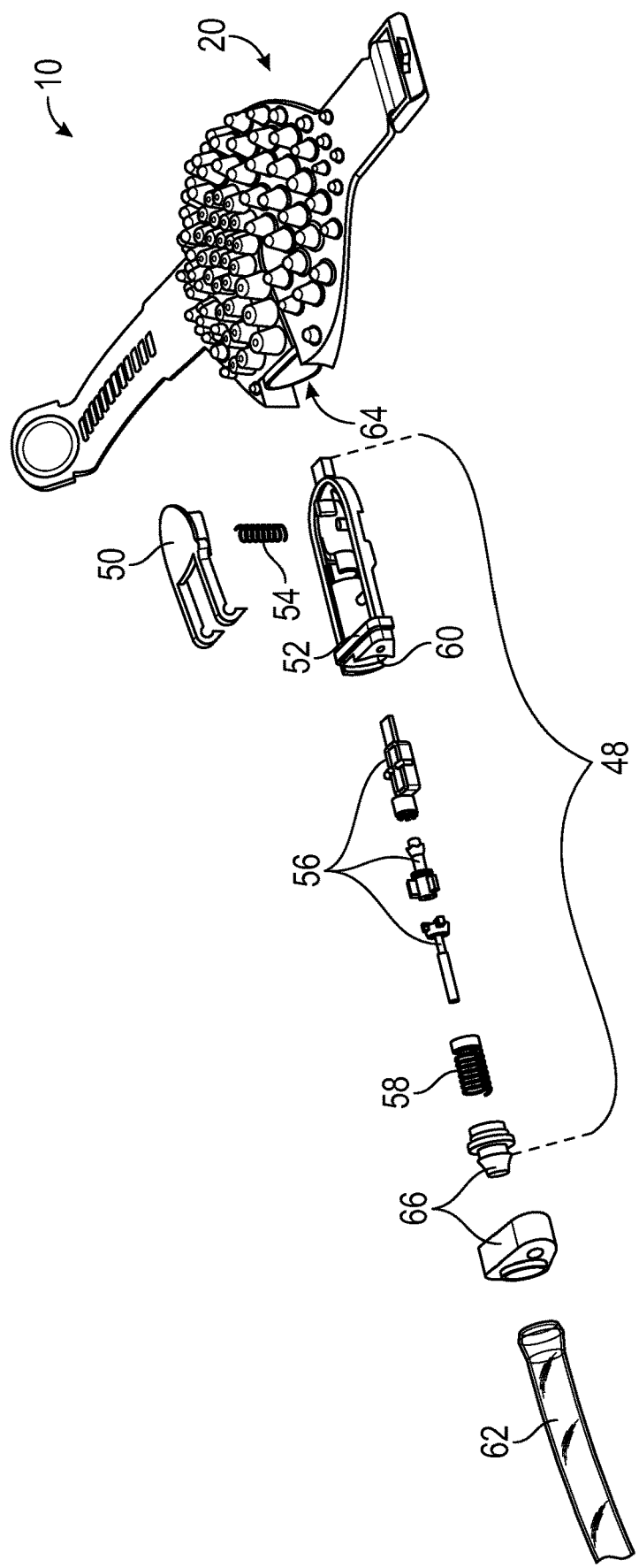
FIG. 3 is an exploded view of an example embodiment.
Figure 4:
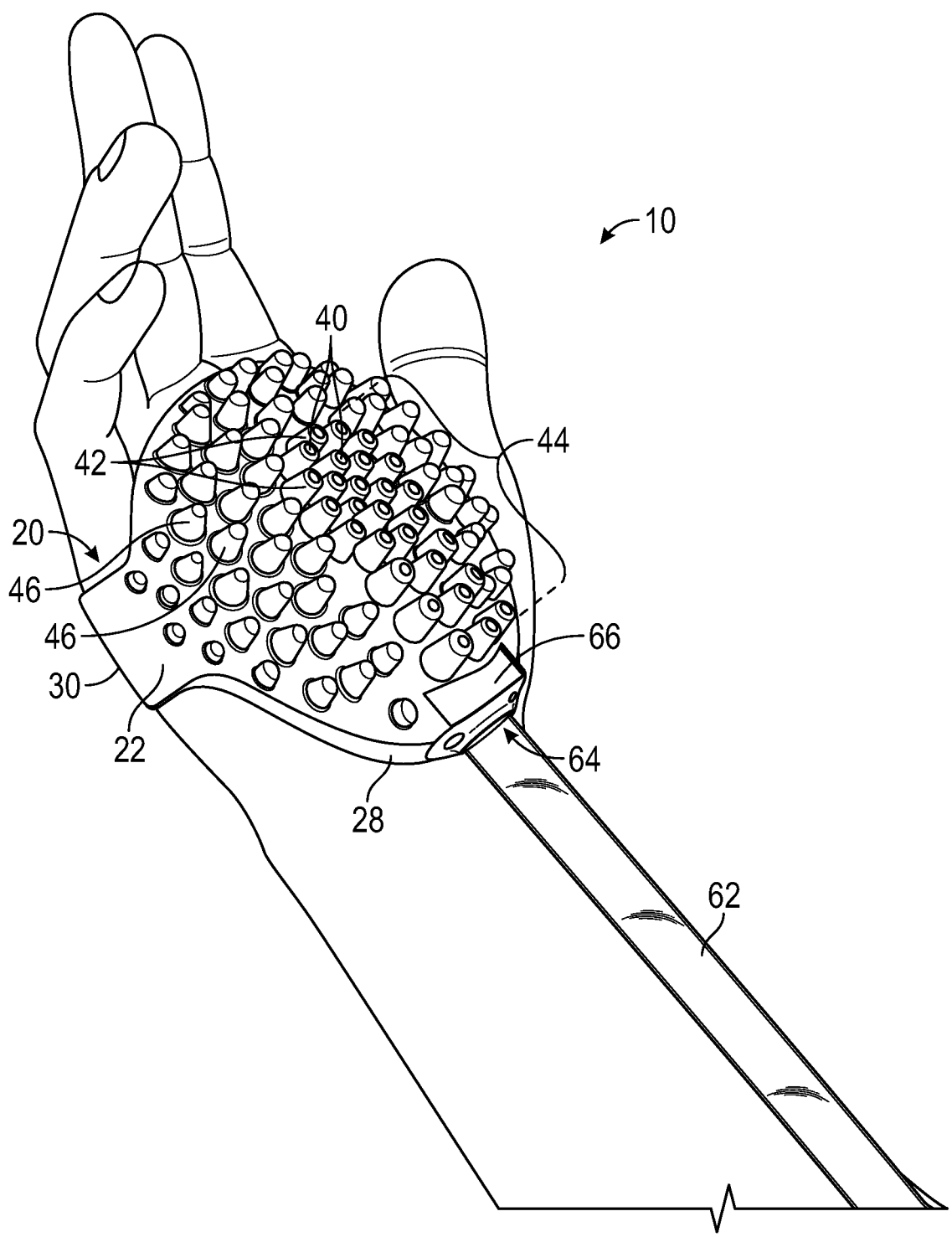
FIG. 4 is an in-use view of an example embodiment attached to a user's hand.

With reference now to the drawings, and in particular FIGS. 1 through 5 thereof, example of the instant hand attachable animal washing apparatus employing the principles and concepts of the present hand attachable animal washing apparatus and generally designated by the reference number 10 will be described.

Referring to FIGS. 1 through 5 a preferred embodiment of the hand attachable animal washing apparatus 10 is illustrated.

The present hand attachable animal washing apparatus 10 has been devised to enable controlled emission of water through a plurality of openings 40 disposed in an obverse surface 36 of a molded body member 20 effected by singlehanded operation of a user wearing the device. The hand attachable animal washing apparatus 10 is attachable overlying the palm of a user whereby the molded body member 20 is disposed against the palm of the user. The plurality of openings 40 disposed in the obverse surface 36 of the molded body member 20 enables controlled outflow of water when an interior valve assembly 48 is activated between a closed situation and an open situation, whereby throughflow of water from a connecting line 62 is directable out each of the plurality of openings 40 for controlled application directly to an animal contacted with the obverse surface 36. Singlehanded operation of the valve assembly 48 enables a user to secure the animal in appropriate position with their other hand during the act of washing.

Discussing now the drawings of an example embodiment of the present device depicted herein, the present hand attachable animal washing apparatus 10, therefore, includes a generally ovoid molded body member 20 attachable overlying the palm of a user's hand. The molded body member 20 is contemplated to by polymeric and flexible, and includes a first side apex 22, a second side apex 24, a distal arced edge 26, and a proximal arced edge 28. A strap member 30 is disposed extended from the first side apex 22, said strap member 30 attachable to a connection portion 32 disposed at the second side apex 24. The strap member 30 and connection portion 32 may resemble a wrist watch strap, for example, and include a buckle member 34 disposed to releasably secure the strap member 30 and connection portion 32 together. Additional means of releasable securement of said strap member 30 and connection portion 32 are contemplated as part of this disclosure.

The molded body member 20 includes an obverse surface 36 and a reverse surface 38. The reverse surface 38 is disposed to overlie the palm of a user's hand to which the device is attached by action of the strap member 30 securing to the connection portion 32 around the dorsal side of the user's hand.

The plurality of openings 40 is disposed endwise upon each of a plurality of outlets 42. Each of the plurality of outlets 42 may be elongate, conical, and disposed in a central cluster 44, as depicted herein, or otherwise disposed upon the obverse surface 36. In the example embodiment shown, a plurality of protuberances 46 is disposed surrounding the central cluster 44, each of said plurality of protuberances 46 disposed to contact through the fur of the animal to which the device is applied when washing. The plurality of protuberances 46, and each of the plurality of outlets 42, act to effect brushing of the animal's coat as well as to apply water into the fur and against the epidermis.

A valve assembly 48 is disposed interiorly within the molded body member 20 in open communication with each of the plurality of openings 40. The valve assembly 48 includes a compressible portion 50 devised to alternately open and close a valve outlet 52 when depressed. The compressible portion 50 is situated in a position interior to the molded body member 20 proximally overlying the center of the user's palm when wearing the device on a hand, whereby said user may effect depression of the compressible portion 50 with said user's fingers by making a fist, and pressing centrally toward said user's palm. The compressible portion 50 is disposed against the action of a first spring member 54, said first spring member 54 disposed to return the compressible portion 50 to an uncompressed position once released. When compressed, the compressible portion 50 enables reorientation of a switch member 56 between a first position and a second position. In the preferred embodiment herein disclosed, movement of the switch member 56 between the first position and the second position includes rotational movement of the switch member 56.

When moved to the first position, the switch member 56 is forced in a first direction against the action of a second spring member 58, whereby the switch member 56 tensions said second spring member 58. The second spring member 58 is prevented from rebounding, however, by action of a stop member 60 against which the switch member 56 is rotatably oriented, whereby the valve outlet 52 is maintained open and the valve assembly 48 is rendered in the open situation. Subsequent depression of the compressible portion 50 reorients the switch member 56 by effecting rotational movement in a second direction, whereby the switch member 56 is disengaged with the stop member 60, and the second spring member 58 is enabled rebound to return the switch member 56 to the second position wherein the valve outlet 52 is closed and the valve assembly 48 is rendered in the closed situation. Alternate depressions of the compressible portion 50 therefore toggle the valve assembly 48 between the open situation and closed situation.

The connecting line 62 is disposed attached at a proximal inlet 64 medially disposed in the proximal arced edge 28 of the molded body member 20 and may be secured thereat by means of a connect housing 66. The connecting line 62 may be detachable from the connect housing 66. The connecting line 62 is distally attachable to a water outlet, such as an existing hose pipe or tap, for example. Opening said tap, or hose pipe, enables flow of water into the connecting line 62 and into the molded body member 20. Water is prevented from exiting through the plurality of openings 40 disposed upon the obverse surface 36 until the valve assembly 48 is disposed in the open situation.

Compression of the compressible portion 50 therefore enables selective opening and closing of the valve assembly 48 between the open and closed situations whereby outflow of water is controllable singlehandedly while washing an animal. A user may, therefore, use their free hand for holding the animal in position, for coaxing or comforting the animal, or otherwise to participate in the act of washing, as desired.

What is claimed is:

1. A hand attachable animal washing apparatus attachable to a hand of a user for singlehanded control of water emitted therefrom, said hand attachable animal washing apparatus comprising:
    a molded body member;
    a reverse surface disposed upon the molded body member and configured to overlie a palm of a hand of a user when the body member is attached to the hand of the user;
    an obverse surface;
    a plurality of outlets projected up from the obverse surface, each of the plurality of outlets having an opening thereatop;
    a proximal inlet in open communication with each of the plurality of openings, said proximal inlet connectable to a connecting line for conveyance of water therethrough; and
    a valve assembly disposed interiorly within the body member in a position enabling singlehanded operation thereof by manual action of the same hand of the user to which the body member is fitted, said valve assembly thereby operational between an open configuration and a closed configuration to control water flow therethrough;
    wherein action of the valve assembly is controllable by the same hand of the user upon which the molded body is worn whereby singlehanded application of water when washing an animal is controllable at one hand.

2. The hand attachable animal washing apparatus of claim 1 wherein the valve assembly comprises:
    a compressible portion disposed against the action of a first spring member, said compressible portion compressible between a compressed position and an uncompressed position;
    a switch member in operational communication with the compressible portion, said switch member alternately positionable between a first position and a second position when the compressible portion is compressed;
    a second spring member tensioned against the switch member when the switch member is moved from the first position to the second position; and
    a stop member disposed to prevent rebound of the second spring member returning the switch member to the first position until the compressible portion is again compressed and the switch member is disengaged from the stop member;
    wherein sequential compression of the compressible portion alternately renders the valve assembly in an open configuration and a closed configuration whereby control of water flow though the valve assembly is effective by singlehanded use of a user.

3. The hand attachable animal washing apparatus of claim 2 wherein a plurality of protuberances is disposed perpendicularly projected from the obverse surface proximal the plurality of outlets.

4. The hand attachable animal washing apparatus of claim 3 wherein the molded body member is polymeric and flexible, said molded body member further comprising:
    a first side apex;
    a second side apex;

a strap member endwise disposed at the first side apex; and a connecting portion endwise disposed at the second side apex, said connecting portion configured for securable connection with the strap member;

wherein the strap member and connecting portion enable securement of the molded body member to the hand of the user.

5. The hand attachable animal washing apparatus of claim 4 wherein the molded body member further comprises a connect housing disposed at the proximal inlet whereby the connecting line is securable into the connect housing.

6. A hand attachable animal washing apparatus comprising:
 a molded body member attachable overtop the palm of a user, said molded body member having:
  an obverse surface, a reverse surface, a first side apex, a second side apex, a distal arced edge, and a proximal arced edge;
 a strap member endwise disposed at the first side apex;
 a connection portion endwise disposed at the second side apex, said connection portion securable to the strap member;
 a plurality of outlets disposed upon the obverse surface;
 each of a plurality of openings disposed endwise upon each of the plurality of outlets;
 a proximal inlet disposed in the proximal arced edge, said proximal inlet disposed in open communication with each of the plurality of openings;
 a connecting line disposed attachable at the proximal inlet, said connecting line distally attachable to an existing water outlet; and
 a valve assembly disposed interiorly within the molded body member between the proximal inlet and each of the plurality of openings, said valve assembly operable between a first position and a second position to selectively control water flow to each of the plurality of openings;
 wherein action of the valve assembly is controllable by one hand of a user upon which the molded body is worn, whereby singlehanded application of water when washing an animal is controllable at one hand.

7. The hand attachable animal washing apparatus of claim 6 wherein the valve assembly comprises:
 a compressible portion disposed against the action of a first spring member, said compressible portion compressible between a compressed position and an uncompressed position;
 a switch member in operational communication with the compressible portion, said switch member rotatably alternately positionable between a first position and a second position when the compressible portion is compressed;
 a second spring member tensioned against the switch member when the switch member is moved from the first position to the second position; and
 a stop member disposed to prevent rebound of the second spring member returning the switch member to the first position until the compressible portion is again compressed and the switch member is rotatably disengaged from the stop member;
 wherein sequential compression of the compressible portion alternately renders the valve assembly in an open configuration and a closed configuration whereby control of water flow though the valve assembly is effective by singlehanded use of a user.

8. The hand attachable animal washing apparatus of claim 7 wherein the molded body member further comprises a connect housing disposed at the proximal inlet whereat the connecting line is attachable.

9. The hand attachable animal washing apparatus of claim 8 wherein the molded body member is polymeric and flexible.

10. The hand attachable animal washing apparatus of claim 9 wherein the plurality of outlets is disposed upon the obverse surface in a central cluster surrounded by a plurality of protuberances assistive in brushing an animal's coat.

11. A hand attachable animal washing apparatus comprising:
 a generally ovoid, polymeric and flexible molded body member attachable overtop the palm of a user, said molded body member having:
  an obverse surface, a reverse surface, a first side apex, a second side apex, a distal arced edge, and a proximal arced edge;
 a strap member endwise disposed at the first side apex;
 a connection portion endwise disposed at the second side apex, said connection portion securable to the strap member;
 a plurality of elongate, conical outlets disposed upon the obverse surface in a central cluster;
 a plurality of protuberances disposed upon the obverse surface approximal and surrounding the central cluster of the plurality of outlets;
 each of a plurality of openings disposed endwise upon each of the plurality of outlets;
 a proximal inlet medially disposed in the proximal arced edge, said proximal inlet disposed in open communication with each of the plurality of openings;
 a connect housing disposed at the proximal inlet;
 a connecting line disposed attachable at the connect housing, said connecting line distally attachable to an existing water outlet;
 a valve assembly disposed interiorly within the molded body member, said valve assembly disposed between the proximal inlet and each of the plurality of openings in a position to proximally overlie the palm of a user wearing the molded body portion, said valve assembly operable between a closed configuration and an open configuration to selectively control water flow through each of the plurality of openings, said valve assembly including:
  a compressible portion disposed against the action of a first spring member, said compressible portion compressible between a compressed position and an uncompressed position;
  a switch member in operational communication with the compressible portion, said switch member rotatably alternately positionable between a first position and a second position when the compressible portion is compressed;
  a second spring member tensioned against the switch member when the switch member is moved from the first position to the second position; and
  a stop member disposed to prevent rebound of the second spring member returning the switch member to the first position until the compressible portion is again compressed and the switch member is rotatably disengaged from the stop member;
 wherein action of the valve assembly is controllable by one hand of a user upon which the molded body is worn, whereby singlehanded application of water when washing an animal is controllable at one hand.

* * * * *